United States Patent [19]
Graber

[11] 4,394,948
[45] Jul. 26, 1983

[54] BICYCLE CARRIER FOR VEHICLES

[76] Inventor: Joseph V. Graber, 3739 County Trunk M, Middleton, Wis. 53562

[21] Appl. No.: 356,197

[22] Filed: Mar. 8, 1982

[51] Int. Cl.³ .............................................. B60R 9/10
[52] U.S. Cl. .............................. 224/314; 224/42.03 B; 224/329
[58] Field of Search ................... 224/42.03 R, 42.03 B, 224/314, 309, 321, 329

[56] References Cited

U.S. PATENT DOCUMENTS

| | | | |
|---|---|---|---|
| 3,710,999 | 1/1973 | Allen | 224/42.03 B |
| 3,927,810 | 12/1975 | Danon | 224/314 |
| 3,927,811 | 12/1975 | Nussbaum | 224/314 X |
| 4,085,874 | 4/1978 | Graber | 224/329 X |
| 4,109,839 | 8/1978 | Allen | 224/42.03 B |
| 4,182,467 | 1/1980 | Graber | 224/309 |

*Primary Examiner*—Steven M. Pollard
*Attorney, Agent, or Firm*—Vernon J. Pillote

[57] ABSTRACT

A collapsible bicycle carrier for mounting on the rear body of a vehicle. The carrier includes a pair of U-shaped frames arranged to extend transversely of the vehicle and which are interconnected by side plates for angular adjustment relative to each other. Bicycle support arms are mounted on the side plates for angular adjustment relative to the side plates and relative to the transverse frames to enable the arms to extend generally horizontally when the carrier is mounted on different types of vehicles.

11 Claims, 11 Drawing Figures

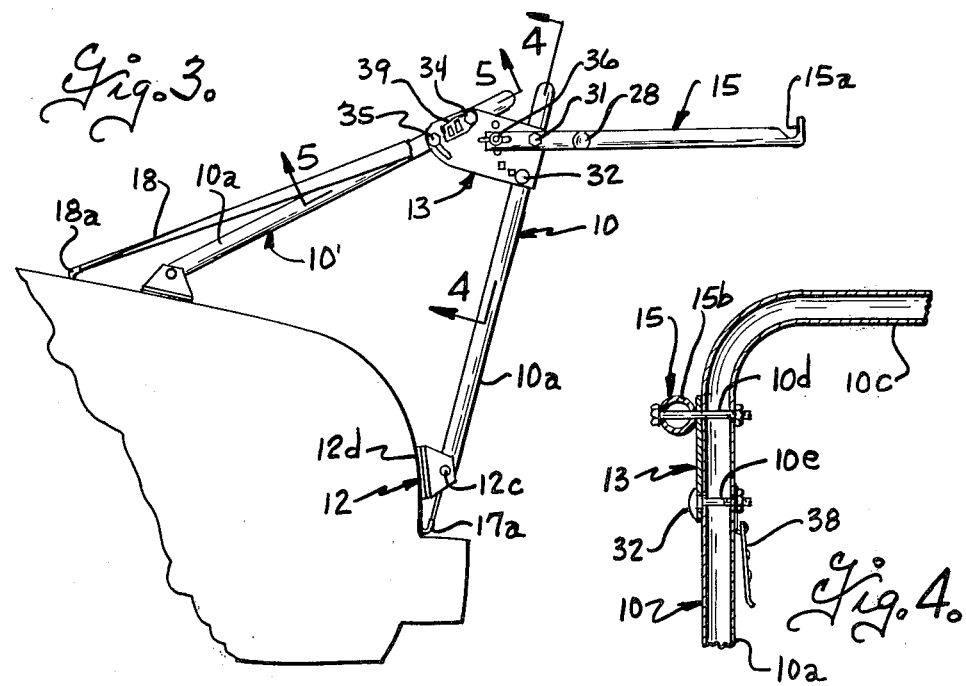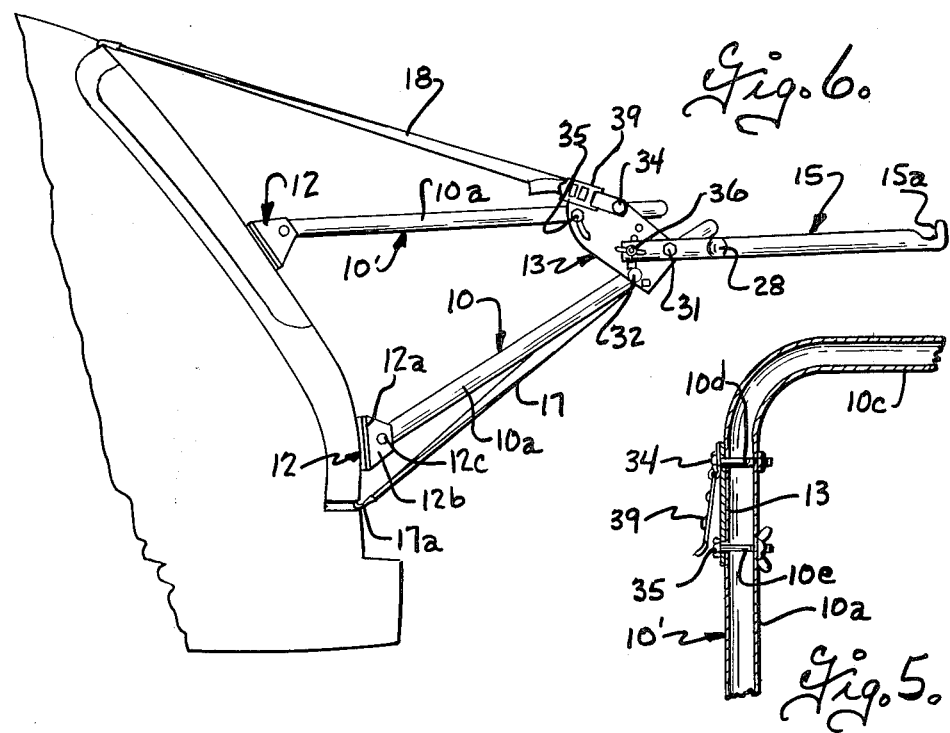

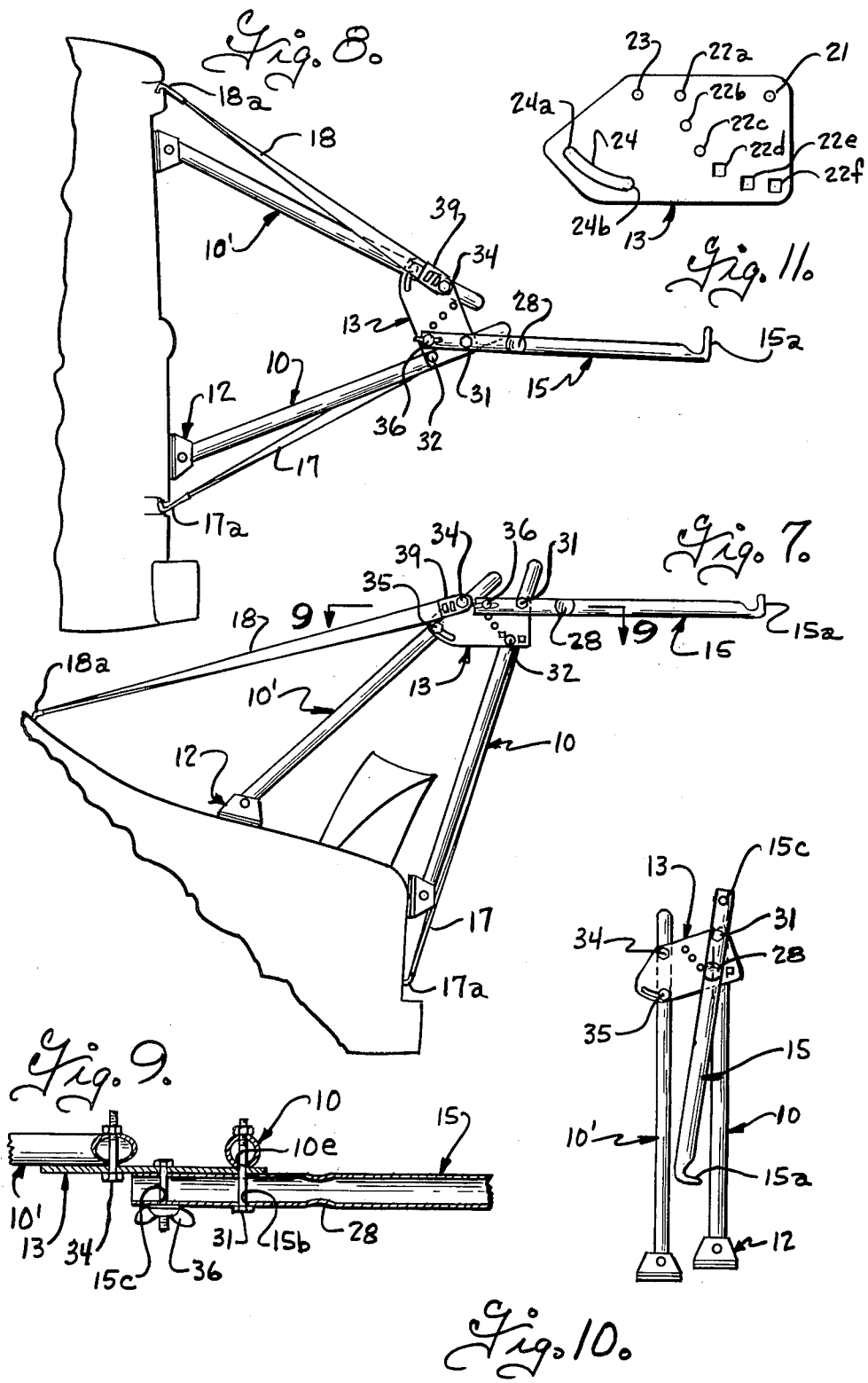

BICYCLE CARRIER FOR VEHICLES

BACKGROUND OF THE INVENTION

The present invention relates to bicycle carriers of the type which are adapted for mounting on a rear body portion of the vehicle. Various different bicycle carriers have heretofore been proposed in which the bicycle carrier has feet or pads for engaging the rear body portion of a vehicle and adjustable straps and hooks for anchoring the bicycle carrier on the rear body portion of the vehicle. The shape and slope of the rear portion of the vehicle bodies on which the carriers are supported varies widely in different vehicles and in my prior bicycle carriers shown in U.S. Pat. Nos. 4,085,874 and 4,182,467, the bicycle support arms were angularly adjustable over a wide range to extend generally horizontally for supporting bicycles in an upright position when the vehicle engaging feet engaged vehicle body portions of different shape and slope. However, my prior bicycle carriers could not be readily folded for compact storage when not in use and were not adjustable to vary the spacing of the vehicle engaging feet. The bicycle carrier shown in U.S. Pat. No. 3,927,811 is foldable to a limited extent. However, the bicycle support arms of this patent are not angularly adjustable to support bicycles in a generally upright position at the rear of the vehicle. U.S. Pat. No. 4,109,839 discloses bicycle carriers which are collapsible for compact storage. However, the bicycle carriers disclosed in this patent utilize angulated side frames that are interconnected by a single cross member. The side frames are adapted to be turned relative to the cross member about the axis of one leg of the side frame between a folded position in which the angulated side frames are disposed adjacent the plane of the cross member, and an erected position in which the side frames are disposed in relatively parallel planes perpendicular to the cross member, and this arrangement limits the stability of the carrier in a direction crosswise of the vehicle.

In order to enable opening of the rear door or deck lid without removing the bicycle carrier, it is necessary to mount the bicycle carrier with all of its vehicle engaging feet within the edges of the rear door or deck lid of the vehicle. Also, in some installations such as where the rear vehicle door or lid has a glass insert, it is desirable to locate the vehicle engaging feet at a particular location on the panel. In addition, it is desirable in some installations to vary the vertical and horizontal position at which the carrier supports the bicycles relative to the vehicle, in order to provide clearance for the bicycles over obstacles such as bumpers, trailer hitches, exhaust pipes and the like or to vary the rearward projection of the bicycles relative to the vehicle. However, the prior bicycle carriers were not adjustable to vary the spacing of the vehicle engaging feet to adapt the carrier for mounting on some small rear doors or trunk lids or to enable positioning the vehicle engaging feet at a desired location on the rear door or lid. Accordingly, in some installations of prior bicycle carriers, the vehicle engaging feet had to rest on a non-moving part of the vehicle body, for example, as shown in U.S. Pat. Nos. 3,710,999 and 3,927,811. Further, prior vehicle carriers were not adapted to adjust the horizontal and vertical position at which the carrier supported the bicycle relative to the vehicle.

SUMMARY OF THE INVENTION

It is an object of this invention to provide a bicycle carrier which is adapted to be mounted at various different positions on the rear body portion of different types of vehicles and which has bicycle support arms that are adjustable to support one or more bicycles in a generally upright condition at the rear of the vehicle to prevent stacking of the bicycles on each other, and which bicycle carrier is foldable for compact storage when not in use.

Another object of this invention is to provide a bicycle carrier adapted to be mounted at various different positions on the rear body portion of different types of vehicles and in which the spacing between the vehicle engaging feet can be adjusted to enable mounting of the carrier within the edges of small rear doors or trunk lids, or to vary the position of the vehicle engaging feet on the rear door or trunk lid.

Still another object of this invention is to provide a bicycle carrier adapted to be mounted at various different positions on the rear body portions of different types of vehicles, and which is adjustable to vary the vertical and horizontal position in which the carrier supports the bicycle relative to the vehicle.

Yet another object of this invention is to provide a bicycle carrier adapted to be supported at various different positions on the rear body portions of different types of vehicles, and which is economical to fabricate and assemble and which is rigid and durable in use.

Accordingly, the present invention provides a bicycle carrier for mounting on a body portion of a vehicle and which comprises front and rear transverse frames of generally U-shaped configuration each formed of one-piece tubular stock and each having first and second leg portions and a transverse intermediate portion integral with one end of the first and second leg portions and extending therebetween, front vehicle engaging feet on the free ends of each of the legs on the front transverse frame and rear vehicle engaging feet on the free ends of the legs on the rear transverse frame, first and second side plates, means including the first and second side plates connecting the front and rear transverse frames at a location adjacent their intermediate portions for relative movement between a folded position in which the leg portions on the front frame are disposed adjacent the leg portions on the rear frame and an open position in which the leg portions on the front frame diverge relative to the leg portions on the rear frame in a direction away from their intermediate portions, first and second bicycle support arms, arm mounting means mounting one end portion of the bicycle support arms on the side plates for angular adjustment relative thereto and relative to the front and rear transverse frames through a plurality of positions in which the arms extend outwardly from the rear transverse frame at different angles to a plane through the vehicle engaging feet, and strap means for attaching the bicycle carrier to a vehicle with the front and rear vehicle engaging feet resting on the body portion of the vehicle.

The angle between the front and rear transverse frames can be adjusted to vary the spacing between the vehicle engaging feet and to also adjust the vertical and horizontal position at which the carrier supports the bicycle relative to the vehicle.

These, together with other objects and advantages of this invention will be more readily understood by reference to the following detailed description taken in connection with the accompanying drawings wherein:

FIGS. 2 and 3 are side elevational views illustrating mounting of the bicycle carrier on the same type of vehicle, but with the angle between the frames adjusted to vary the horizontal and vertical position at which the carrier supports the bicycle relative to the vehicle;

FIG. 4 is a fragmentary sectional view taken on the plane 4—4 of FIG. 3 and illustrating the parts on a larger scale than FIG. 3;

FIG. 5 is a fragmentary sectional view taken on the plane 5—5 of FIG. 3 and illustrating the parts on a larger scale than FIG. 3;

FIGS. 6, 7 and 8 are side elevational views of the bicycle carrier illustrating mounting of the carrier on different types of vehicles;

FIG. 9 is a fragmentary sectional view taken on the plane 9—9 of FIG. 7 and illustrating the parts on a larger scale than FIG. 3;

FIG. 10 is a side elevational view of the bicycle carrier in a folded condition; and FIG. 11 is a side view of one of the side plates of the bicycle carrier.

Figure 1:
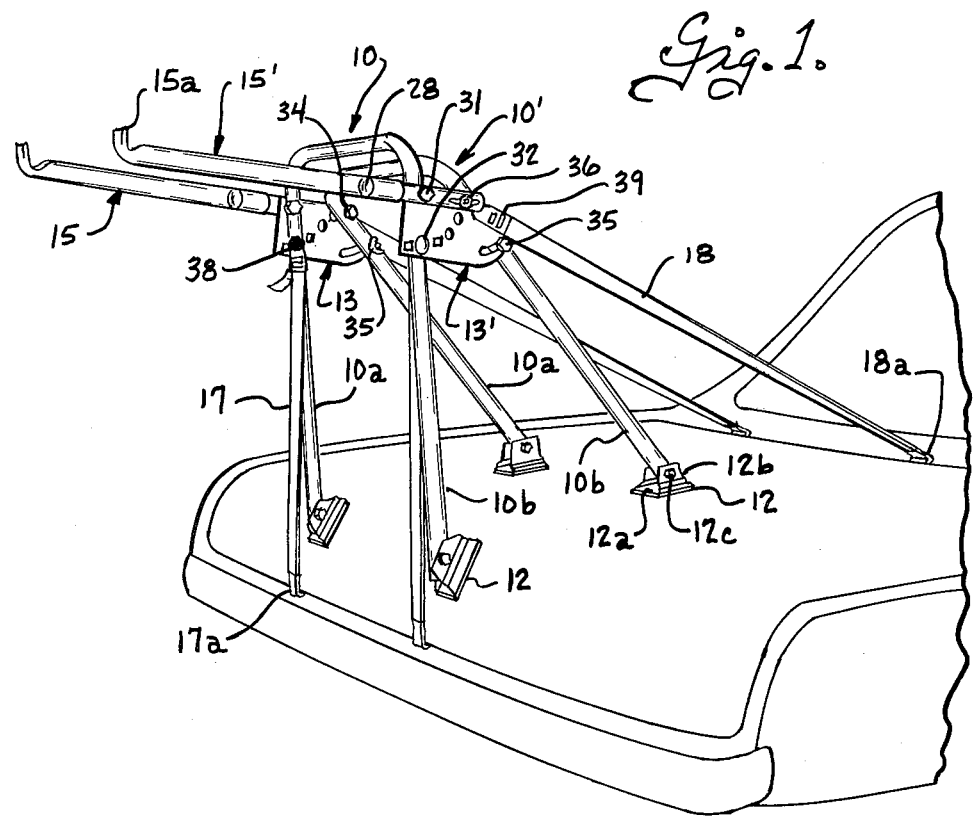
FIG. 1 is a fragmentary perspective view of a rear portion of the vehicle having the bicycle carrier of the present invention mounted thereon.

The bicycle carrier of the present invention is constructed and arranged to support one or more bicycles at the rear of a vehicle and is adapted for use with vehicles of widely different size, shape and design including sedans, hatch backs, station wagons and vans. The bicycle carrier generally includes a pair of rigid transverse frames 10 and 10' of generally U-shaped configuration and having vehicle engaging feet 12 on the free ends of their legs, and first and second side plates 13 and 13' connecting the transverse frames 10 and 10' for relative movement between a folded condition in which the legs of the transverse frames are disposed adjacent each other, and an erected condition in which the legs of the transverse frames diverge relative to each other. The bicycle carrier also includes a pair of bicycle support arms 15 and 15' that are mounted on the side plates 13 and 13' respectively for angular adjustment relative to the side plates and relative to the traverse frames 10 and 10' to enable the bicycle support arms to extend generally horizontally when the vehicle engaging feet of the carrier engage the rear body portion of different types of vehicles. The bicycle carrier is attached to a panel at the rear of the vehicle by first and second pairs of straps 17, 18. The bicycle carrier is adapted for mounting on the rear portions of various different types of vehicles and when mounted on sedans, the transverse frame 10 is disposed rearwardly on the vehicle relative to the transverse frame 10'. For convenience, the transverse frame 10 is herein and in the claims sometimes referred to as rear transverse frame and the frame 10' is herein and in the claims sometimes referred to as the front transverse frame.

The U-shaped transverse frames 10 and 10' each include a pair of spaced leg portions 10a and 10b that are interconnected at one end by a transverse intermediate portion 10c. The transverse frames are formed of a light weight tubular metal such as steel tubing which is bent to form the aforementioned leg portions and transverse intermediate portion. The vehicle engaging feet 12 on the free ends of the legs of the transverse frames are of like construction and are preferably pivotally attached to the free ends of the leg portions to conform to the contour of the vehicle body at the point of engagement therewith. In general, the vehicle engaging feet include a base 12a and upstanding ears 12b, and a fastener such as a bolt or rivet 12c extends through openings in the ears and through openings in the lower ends of the respective leg portions to support the feet on the leg portions for pivotal movement about an axis that is transverse to the leg portions and parallel to a plane through the leg portions of the respective frame. A resilient pad 12d of rubber or the like underlies the base portion 12a of each vehicle engaging foot, to protect the vehicle finish.

The side plates 13 and 13' are formed with fastener receiving openings for receiving the transverse frame arm attaching fasteners. The number and arrangement of the fastener receiving opening is the same for both side plates and like numbers are used to designate corresponding openings. As best shown in FIG. 11, each side plate includes a fastener receiving opening 21 and a set of fastener receiving openings, herein shown six in number and designated 22a-22f that are arranged in an arc about the opening 21. For reasons pointed out hereinafter, some of the openings 22a-22c are circular and others of the openings 22d-22f are square. The side plates also include a fastener receiving opening 23 and a slot 24 that extends through an arc concentric with the opening 23. The transverse frames 10 and 10' are preferably of like size and shape to minimize the number of different parts which must be fabricated and stocked and the leg portions of the transverse frames 10 and 10' each have a pair of fastener receiving openings 10d and 10e at the ends adjacent their intermediate portion 10c. The spacing of the fastener receiving openings 10d and 10e in the leg portions of the frame 10' is made the same as the radial spacing between the opening 21 and the set of openings 22a-22f in the side plates and the spacing between the openings 10d and 10e in the leg portions of the frame 10' is made the same as the spacing between the fastener receiving opening 23 and the slot 24.

The bicycle support arms 15 and 15' are also of like construction and are herein shown formed of a length of tubular metal and each have a laterally extending bicycle stop 15a at their outer ends. The bicycle support arms also have a pair of fastener receiving openings 15b and 15c at their other ends (See FIGS. 4 and 9) which are spaced apart a distance corresponding to the spacing between the opening 21 and the set of openings 22a-22f in the side plates. A protective sheath of a resilient material such as rubber or plastic is preferably provided on the arms to protect the bicycles and may be applied by inserting a sleeve of the protective material over the arms or by otherwise coating or dipping the arms.

The first and second side plates 13 and 13' are attached to the first and second legs 10a and 10b respectively of the transverse frame 10 by fasteners 31 and 32. The fasteners 31 are also advantageously used to attach the first and second arms 15 and 15' to the respective first and second side plates 13 and 13'. In the embodiment shown, the fasteners 31 each comprise a bolt or rivet that extends through openings 15b in the arm and through an opening 21 in the respective side plate and through opening 10d in the respective leg portion. The arms 15 and 15' are angularly adjustable about the fasteners 31 and the fasteners 32 are adapted to extend through the openings 10e in the respective leg portion of the frame 10 and through a selected one of the openings 22d, 22e or 22f in the associated side plate to enable angular adjustment and locking of the transverse frame 10 relative to the side plates in several different angular positions. Fastener 32 is preferably a carriage type bolt having a rounded head and a square shank adjacent the head adapted to be non-rotatably received in a selected one of the square openings 22d-22f. A nut is provided on the threaded end of the bolt 32 for securing the rear frame and the side plate in adjusted position. Arms 15 are advantageously provided with dimples 28 spaced from the fastener receiving openings 15b a distance corresponding to the spacing between fasteners 31 and 32 and adapted to pass over the heads on fasteners 32 when the arms are moved to their folded condition shown in FIG. 10. The side plates 13 and 13' are also attached to the leg portions 10a and 10b respectively of the transverse frame 10' by fasteners 34 and 35. As best shown in FIG. 5, the fastener 34 comprises a bolt or rivet that extends through the opening 23 in each of the side plates and through openings 10d in the associated legs of the frame 10'. Fastener 35 is preferably in the form of a bolt that extends through the slot 24 in each of the side plates and through the fastener receiving openings 10e in the associated leg portion of the frame 10'. When the nut on the bolt 35 is loosened, the slot 24 allows angular movement of the frame 10' about the bolt 35, between a folded position in which the legs of the frames 10 and 10' extend alongside each other as shown in FIG. 10, and an open or erect position in which the legs on the frames 10 and 10' diverge relative to each other as shown in FIGS. 1-3 and 6-8. One end of the slot 24a is located to engage the fastener 35 and limit maximum opening movement of the frames 10 and 10' and the other end of the slot 24b is located and arranged as to allow the legs to be moved into close adjacency as shown in FIG. 9. A wing nut is preferably provided on the bolt 35 as shown in FIG. 5 to facilitate tightening and loosening of the fastener for folding and erecting the carrier. Another fastener 36 is provided to secure the arms 15 and 15' in angularly adjusted position relative to the side plates. The fasteners 36 comprise bolts that extend through openings 15c (FIG. 9) in the respective arm and are adapted to be positioned in a selected one of the openings 22a-22d in the associated side plate to secure the arms in angularly adjusted position relative to the respective side plate and to the frames 10 and 10'. Wing nuts are preferably provided on the threaded ends of bolts 36 to facilitate removal of the bolts for folding of the arms to the position shown in FIG. 10.

The straps 17 have hooks 17a at one end adapted to engage one edge of a panel such as a trunk lid or door on the rear portion of a vehicle and the straps 17 are adapted to be secured at their other ends by buckles 38 to the frame 10 at a location spaced from the vehicle engaging feet 12. As best shown in FIGS. 1 and 4, the buckles 38 are conveniently attached by the same fasteners 32 that are used to secure the frame 10 to the side plates. The straps 18 have hooks 18a at one end and are adapted to be attached at their other ends by buckles 39 to the frame 10' at a location spaced from the vehicle engaging feet. As shown, the buckles 39 are conveniently secured to the same bolts 34 that are used to attach the side plates to the legs of the frame 10'.

Figure 2:
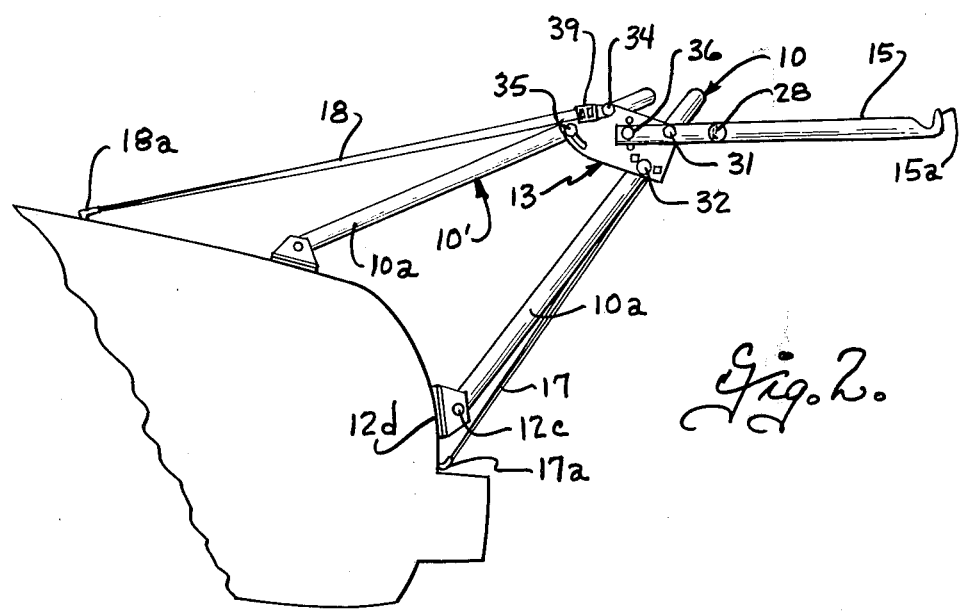

The front and rear transverse frames are angularly adjusted relative to each other to vary the spacing between the vehicle engaging feet 12 on the front and rear frames, as may be desired in some installations to assure that the vehicle engaging feet are located within the edges of the trunk lid or door, or to enable locating the vehicle engaging feet at a preselected position on the panel, for example near the edge portions of glass inserts on panels having glass inserts. In addition, changing of the angularity between the front and rear frames also affects the horizontal and vertical position at which the bicycles are supported relative to the rear of the vehicle and, by adjusting the angle between the front and rear frames, it is possible to increase or decrease the elevation at which the carrier supports the bicycles and the horizontal clearance between the bicycles and the rear of the vehicle. In addition, bicycle support arms are angularly adjustable relative to the front and rear frames to extend generally horizontally when the carrier is mounted on vehicle bodies of widely different shape and contour to support the bicycles in an upright condition and prevent the bicycles from stacking on each other. In the preferred embodiment illustrated, the frames 10, 10' have an overall height of about 19 inches and a width of about 15 inches and, when the fasteners 32 for attaching the legs of the rear frame to the side plates are positioned in openings 22e as shown in FIGS. 1, 2, 6 and 7, the vehicle engaging feet are spaced apart about twelve inches. Such an arrangement is desirable for trunk lids or doors of small size, in order to locate the vehicle engaging feet within the edges of the panel, or in installations where it is necessary to clear a relatively high obstacle such as an air fin used on some cars such as shown in FIG. 7. The fastener 32 can also be positioned in the opening 22f to increase the spacing between the vehicle engaging feet on the frames 10 and 11 to about seventeen inches, as shown in FIGS. 3 and 8. Changing the spacing between the vehicle engaging feet on the frames 10 and 11 is also sometimes desirable to enable locating the vehicle engaging feet in a desired position on the panels. For example, when the panel has a glass insert, it is desirable to locate the vehicle engaging feet near the supported edges of the glass insert. In addition, changing the angular relation between the frames 10 and 10' can be utilized to change the vertical and horizontal position at which the bicycles are supported on the rear of some vehicles. For example, as will be seen from a comparison of FIGS. 2 and 3, increasing of the angle between the frames 10 and 10' by moving the fastener 32 from the opening 22e in the side plates as shown in FIG. 2 to the opening 22f in the side plates as shown in FIG. 3, increases the elevation of the bicycle support arms and decreases the rearward projection of the bicycle support arms relative to a sedan type vehicle.

The carrier can be readily folded for impact storage when not in use without requiring disassembly of the carrier. Folding of the carrier for storage is accomplished by loosening the wing nuts on fasteners 35 and folding the front frame 10' toward the rear frame to the position shown in FIG. 9. The bicycle support arms can be folded by removing the fasteners 36 and swinging the arms to a position such as shown in FIG. 9.

The embodiments of the invention in which an exclusive property or privilege is claimed are defined as follows:

1. A foldable bicycle carrier for mounting on a body portion of a vehicle comprising:
  (a) front and rear transverse frames of generally U-shaped configuration each formed of one-piece tubular stock and each having first and second leg portions and a transverse intermediate portion integral with one end of the first and second leg portions and extending therebetween, (b) front vehicle engaging feet on the free ends of each of the first and second leg portions on the front transverse frame and rear vehicle engaging feet on the free ends of each of the first and second leg portions on the rear transverse frame,
(c) first and second bicycle support arms,
(d) first and second side plates,
(e) means including said first and second side plates connecting the front and rear transverse frames at a location adjacent their intermediate portions for relative movement between a folded position in which the leg portions on the front frame are disposed adjacent the leg portions on the rear frame and an open position in which the leg portions on the front frame diverge relative to leg portions on the rear frame in a direction away from said intermediate portions to space the front vehicle engaging feet from the rear pair of vehicle engaging feet,
(f) arm mounting means mounting one end portion of the first and second bicycle support arms respectively on the first and second side plates for angular adjustment relative thereto and relative to the front and rear transverse frames through a plurality of positions in which each of the arms extend outwardly from the rear transverse frame at different angles to a plane through the front and rear vehicle engaging feet, and
(g) strap means for attaching the bicycle carrier to a vehicle with the front and rear vehicle engaging feet resting on a body portion of the vehicle.

2. A foldable bicycle carrier according to claim 1 wherein said front and rear frames are of like size.

3. A foldable bicycle carrier according to claim 1 wherein said vehicle engaging feet are each mounted on the end of the respective leg portion for pivotal movement relative thereto.

4. A bicycle carrier for mounting on a body portion of a vehicle comprising:
(a) front and rear transverse frames of generally U-shaped configuration each formed of one-piece tubular stock and each having first and second leg portions and a transverse intermediate portion integral with one end of its leg portions and extending therebetween,
(b) front vehicle engaging feet on the free ends of each of the leg portions on the front transverse frame and rear vehicle engaging feet on the free ends of each of the leg portions on the rear transverse frame,
(c) first and second bicycle support arms,
(d) first and second side plates,
(e) rear frame fastener means for securing the first and second side plates respectively to the first and second leg portions of the rear transverse frame adjacent its intermediate portion, front frame fastener means for securing the first and second side plates respectively to the first and second leg portions of the front transverse frame adjacent its intermediate portion with the front transverse frame diverging relative to the rear transverse frame in a direction away from the side plates, the side plates and the front frame fastening means and the rear frame fastening means being constructed and arranged for adjustment of the angle between the front and rear transverse frames,
(f) support arm fastener means for mounting one end portion of the first and second bicycle support arms respectively on the first and second side plates to extend rearwardly therefrom, the first and second side plates and the support arm fastening means being constructed and arranged for angular adjustment of the first and second bicycle support arms relative to the side plates and relative to the front and rear transverse frames to enable the support arms to be positioned generally horizontally when the front and rear vehicle engaging feet are disposed at different elevations, and
(g) strap means for attaching the bicycle carrier to a vehicle with the front and rear vehicle engaging feet resting on a body portion of the vehicle.

5. A bicycle carrier according to claim 4 wherein said first and second side plates each have an arcuate slot and a front fastener receiving opening concentric with said arcuate slot, said front frame fastener means including a first front fastener extending through said arcuate slot and a second front fastener extending through said first fastener receiving opening for adjustment of the angle between the front and rear transverse frames.

6. A bicycle carrier according to claim 5 wherein said first and second side plates each have a first rear fastener receiving opening and at least two other rear fastener receiving openings disposed in an arc concentric with said first fastener receiving opening, said rear frame fastener means including a first rear fastener extending through said first rear fastener receiving opening and a second rear fastener adapted to extend through one of said other rear fastener receiving openings for adjustment of the angle between the front and rear transverse frames.

7. A bicycle carrier according to claim 4 wherein said first and second side plates each have a first rear fastener receiving opening and at least two other rear fastener receiving openings disposed in an arc concentric with said first fastener receiving opening, said rear frame fastener means including a first rear fastener extending through said first rear fastener receiving opening and a second rear fastener adapted to extend through one of said other rear fastener receiving openings for adjustment of the angle between the front and rear transverse frames.

8. A bicycle carrier according to claim 4 wherein said front and rear frames are of like size.

9. A bicycle carrier for mounting on a body portion of a vehicle comprising:
(a) front and rear transverse frames of generally U-shaped configuration each formed of one-piece tubular stock and each having first and second leg portions and a transverse intermediate portion integral with one end of the first and second leg portions and extending therebetween, each leg portion having two fastener receiving openings adjacent said one end,
(b) front vehicle engaging feet on the free ends of each of the first and second legs on the front transverse frame and rear vehicle engaging feet on the free ends of each of the first and second legs on the rear transverse frame,
(c) first and second bicycle support arms each having two fastener receiving openings adjacent one end thereof,
(d) a first side plate associated with the first legs of the front and rear frames and the first bicycle support arm and a second side plate associated with the second legs of the front and rear frames and the second bicycle support arm, each side plate including a rear pivot fastener receiving opening and a plurality of fastener receiving openings arranged in an arc concentric with said rear pivot fastener receiving opening, each side plate including a front pivot fastener receiving opening and an arcuate slot concentric with said front pivot fastener receiving opening, (e) and fastener means connecting the associated side plates, arms and legs, said fastener means including (1) a first fastener extending through the rear pivot receiving opening in each side plate and through one of the fastener receiving openings in the associated arm and through one of the fastener receiving openings in the associated leg on the rear transverse frame, (2) a second fastener extending through a second one of fastener receiving openings in each leg on the rear transverse frame and adapted to extend through a selected one of said plurality of openings in the associated side plate to secure the rear transverse frame to the side plates in a preselected angularly adjusted position relative thereto, (3) a third fastener extending through a second one of the fastener receiving openings in each arm and adapted to extend through a selected one of said plurality of openings in the associated side plate to secure the arms to the side plates in a preselected angularly adjusted position relative thereto, (4) a fourth fastener extending through the front pivot receiving opening in each side plate and through one of the fastener receiving openings in the associated leg on the front transverse frame, (5) a fifth fastener extending through the arcuate slot in each side plate and through a second one of the fastener receiving openings in the associated leg on the front transverse frame for limiting angular movement of the front frame between a position adjacent the rear frame and a position diverging relative thereto in a direction away from the side plates, and (f) strap means for attaching the bicycle carrier to a vehicle with the front and rear vehicle engaging feet resting on a body portion of the vehicle.

10. A bicycle carrier according to claim 9 wherein said front and rear frames are the same size.

11. A bicycle carrier according to claim 9 wherein the front and rear vehicle engaging feet are mounted on the associated legs for pivotal movement relative thereto.

* * * * *